United States Patent Office 3,085,907
Patented Apr. 16, 1963

3,085,907
AQUEOUS POLYMERIC METHYL METHACRY-
LATE COMPOSITIONS FOR COATING CEMENT
PRODUCTS AND METHODS FOR COATING
SUCH PRODUCTS
Richard E. Zdanowski, Philadelphia, Pa., and George L.
Brown and Bjorn E. Larsson, Moorestown, N.J., as-
signors to Rohm & Haas Company, Philadelphia, Pa.,
a corporation of Delaware
No Drawing. Filed May 21, 1959, Ser. No. 814,660
12 Claims. (Cl. 117—126)

This invention relates to coated hydraulic cement prod-
ucts, especially to asbestos-cement products. More par-
ticularly, it relates to the preparation of asbestos-rein-
forced cementitious products such as shingles and siding
materials. Specifically it relates to an improved process
for the preparation of coated asbestos-cement shingles
and sidings which do not effloresce. This application is a
continuation-in-part of our copending United States ap-
plication Serial No. 725,509, filed April 1, 1958, now
abandoned.

It is known to apply aqueous dispersions of various
synthetic addition polymers to cement products and par-
ticularly asbestos-cement products for the prevention of
blooming or efflorescence caused by the leaching out of
small amounts of free calcium oxide present in the cement
product by water in an accelerated curing process known
as steam autoclaving or even by water present in the article
during manufacture. Polymers of styrene used for this
purpose have the disadvantage of discoloration because
of exposure outdoors to ultraviolet light and weathering
influences. Polymers of vinyl acetate are subject to
hydrolysis by the alkalinity of the cement product and,
therefore, fail in the autoclave or in cases of natural aging
conditions tend to deteriorate with time. Polymers com-
posed largely of ethyl acrylate and methyl acrylate are
likewise subject to such hydrolysis although not to as
great an extent as the vinyl acetate polymers. While
such copolymers might perform satisfactorily on shingles
prepared by the so-called Norton dry process where only
a stoichiometric amount of water is added to the cement/
asbestos slurry, they fail on products made by the
Hatschek wet method employing excess water.

Polymers composed largely of methyl methacrylate such
as from 85% by weight up to 100% provide substan-
tially complete resistance to hydrolysis regardless of the
process used in the manufacture of the shingles even
though the polymer may contain as much as 15% by
weight of a lower alkyl acrylate or vinyl acetate which
would ordinarily be subject to hydrolysis. However,
unmodified aqueous dispersions of such copolymers do
not form continuous films unless very high temperatures
are employed. Attainment of such temperatures is im-
practical because of economic considerations and fre-
quently impossible because of handling difficulties. More-
over, the boiling temperature of water imposes an upper
thermal limit which cannot be exceeded unless the coating
is effected in a pressure chamber in which the pressure
is adequate to prevent boiling of the coating composition
during the drying thereof.

The use of plasticizers, such as dibutyl phthalate (boil-
ing point 340° C.), butyl benzyl phthalate (B.P. 380°
C.), or aryloxyalkyl ethers (B.P. above 350° C.), dis-
closed in United States Patent 2,286,767, has been known
to be helpful in obtaining continuous films with such com-
positions at reasonable temperatures. These compounds,
however, have a major limitation in the fact that their
low volatility (high boiling point) leads to their retention
in the polymer film under ordinary drying conditions
which is reflected in a high degree of film plasticity.
This condition leads to two major difficulties which in
many cases prohibit the use of these plasticized systems
due to high reject rates on production lines, as follows:

(1) In cases where newly-formed shingles are sub-
jected to an accelerated curing operation commonly re-
ferred to as "autoclaving," which involves exposure of
the coated articles to live steam at such high tempera-
tures as 150° to 180° C. for periods ranging from 6 to
18 hours, the highly elastic state of the films facilitates
penetration of water into the polymer layer leading to
the redispersion of the polymer particles and disruption
of film continuity. Steam distillation or simple evapora-
tion of plasticizer from the dispersed polymer particles
leads in turn, upon removal of heat at the end of the
autoclave cycle, to the deposition of uncoalesced polymer
particles on the shingle surface in the form of salt-like
deposits commonly known through the industry as "water
markings." Such condition not only fails in the provision
of a continuous barrier to prevent efflorescence (which is
a serious problem in the autoclaving operation) but also
contributes itself to the unsightly appearance of the
shingle, making it useless commercially.

(2) Additionally, even in operations where autoclaving
is not employed and the efflorescence problem is mini-
mized (although not eliminated) film plasticized with
such high boiling modifiers is so tacky that coated prod-
ucts cannot be stacked without running into the difficulty
of blocking. This situation not only is a problem in sepa-
rating the shingles, but also sometimes results in rupture
of the film and loss of its function as a continuous barrier
preventing efflorescence.

In Bettoli et al. Patent 2,778,283, January 22, 1957, a
procedure is employed wherein an uncured cement prod-
uct such as an asbestos-cement shingle is coated with an
aqueous polymer of an acrylic ester while in the un-
cured state and in order to permit piling of the coated
products during drying without encountering troublesome
blocking, the polymer is provided with a small content
of acid and the dispersion contains a polyvalent metal
which cross-links the polymer through the acid groups on
drying. By such cross-linking, the tackiness and blocking
that would otherwise occur during the stacking and drying
are avoided. Because the polymers employed in the
patented process are those which form films well below
100° C. and in order to do so the content of methyl
methacrylate is limited, those compositions do not prevent
efflorescence under the severe autoclaving conditions and
they are subject to severe "water marking."

It is a primary object of the present invention to pro-
vide aqueous dispersions of polymers containing at least
85% by weight of methyl methacrylate for the coating of
cement products to provide thereon a durable coating
which prevents blooming under autoclaving as well as
under natural ageing or weathering conditions. Another
object of the invention is to provide such an aqeous
dispersion which is of such character that it can be ap-
plied to the finished shingles or to the uncured shingles
and then stacked for drying or for curing either at normal
room temperatures or at elevated temperature and high
humidity such as would be employed in an autoclaving process. A further object is to provide coated cement products carrying methyl methacrylate polymers which are highly resistant to the effect of water, to ultraviolet light, to the penetration of moisture, which are less subject to staining by dirt or by water-borne stains, and which have an outstanding glossy appearance. Other objects and advantages of the invention will be apparent from the description hereinafter.

In accordance with the present invention, aqueous dispersions of polymers of at least 85% by weight of methyl methacrylate such as those having a molecular weight of several million which are prepared by conventional emulsion polymerization procedures are modified by the incorporation of about 20% to 60% by weight, based on the weight of the polymer, of a water-soluble or a water-insoluble solvent for the polymer with a boiling point (at 760 mm. Hg) in the range of from 150° C. to 255° C. and preferably in the range of 170° to 215° C. The lower limit of the boiling range of the solvent is such that the modifier will not leave the polymer particles before sufficient evaporation of water has taken place to effect particle compaction to a point where deformation of the polymeric particles can take place and result in coalescence into a continuous film. On the other hand, the upper limit of the boiling range is such that once film continuity has been achieved the solvent leaves the film readily so as to facilitate a rapid development of film hardness.

The preferred solvents are those having the formula $$R^0O(C_2H_4O)_nH \qquad (I)$$

where $R^0$ is selected from the group consisting of phenyl and ($C_1$ to $C_6$)-alkyl groups, and $n$ is an integer having a value from 1 to 2.

Examples of these solvents (and their boiling points or ranges) are β-(phenyloxy)-ethanol (245.2° C.), β-(butoxy)-ethanol (170.6° C.), β-(2-ethylbutoxy)-ethanol (187–207° C.), the monomethyl ether of diethylene glycol (193.2° C.), the monoethyl ether of diethylene glycol (201.9° C.), and the monobutyl ether of diethylene glycol (231.2° C.). Another preferred solvent is bis-(β-ethoxyethyl) ether, having a boiling range of 180° to 190° C.

Another somewhat less preferred group of solvents are those having the formula

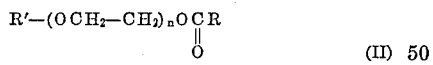

where

R is an alkyl group of 1 to 3 carbon atoms or a phenyl group, $n$ is a number from 1 to 2, and R′ is an alkyl group of 1 to 4 carbon atoms.

Examples of these solvents (and their boiling points) are 2-ethoxyethyl acetate (156° C.), 2-butoxyethyl acetate (191° C.), 2-(2-ethoxyethoxy)ethyl acetate (217° C.), 2-(2-butoxyethoxy)ethyl acetate (246° C.), 2-ethoxyethyl propionate, 2-ethoxyethyl butyrate (188° C.), 2-methoxyethyl propionate (159° C.), 2-methoxyethyl butyrate (177° C.), and 2-methoxyethyl benzoate (252° C.). Other suitable solvents (and their boiling points) are 3-ethoxypropyl acetate, 3-ethoxypropyl propionate, benzyl alcohol (205° C.), benzyl acetate (213° C.), benzyl propionate (220° C.), benzyl butyrate (240° C.), butyl lactate (188° C.), ethyl benzoate (211° C.), isophorone (215° C.), methyl hexyl ketone (173.5° C.), amyl hexyl ketone (168° C.), methyl phenyl ketone (202.3° C.), and dimethyl formamide (153° C.).

The polymers are those containing at least 85% of methyl methacrylate and they may include 100% methyl methacrylate. The polymer may contain up to 15% by weight of other comonomers and particularly of esters of acrylic acid with an alcohol having 1 to 18 carbon atoms, and preferably 1 to 4 carbon atoms, such as methyl, ethyl, or butyl acrylate. A small proportion from about ¼% to 2% of the copolymer may be formed of monomers imparting hydrophilic characteristics to the polymer such as acrylic acid, methacrylic acid, itaconic acid, acrylamide, methacrylamide, beta-hydroxyethyl acrylate, beta-hydroxyethyl vinyl ether, beta-aminoethyl acrylate, beta-N,N-dimethylaminoethyl acrylate, and the like. The polymer dispersions may be prepared by emulsifying in water at a temperature from 0° C. to 100° C., and preferably from 10° to 60° C., either methyl methacrylate or a mixture of at least 85% by weight of methyl methacrylate with one or more of other monomers such as those mentioned hereinabove to make the total of monomers up to 100%. Any conventional emulsifying agent may be employed either of anionic, non-ionic, or cationic character, such as sodium lauryl sulfate or ethylene oxide condensates of ($C_8$–$C_{18}$)-alkyl phenols, e.g., t-octylphenol (containing from 8 to 50 oxyethylene units per molecule), the amounts being from about ½% to 6% by weight of the monomers. The polymerization is then effected at any temperature in the range specified above by the introduction of free-radical initiators such as azo catalysts and the like. Peroxidic free-radical catalysts, particularly catalytic systems of the redox type, are recommended, such as a combination of potassium persulfate and sodium metabisulfite. Other suitable peroxidic agents include the "persalts" such as the alkali metal and ammonium persulfates and perborates, hydrogen peroxide, organic hydroperoxides, such as tert-butyl hydroperoxide and cumene hydroperoxide, and esters such as tert-butyl perbenzoate. In this way it is possible to prepare dispersions which contain as little as 1% or as much as 60% of the resinous copolymer on a weight basis. It is, however, more practical—hence preferred—to produce dispersions which contain about 30% to 50% resin-solids and which can be diluted as desired for application to the asbestos-cement compositions.

The solvent mentioned hereinabove is preferably introduced into the aqueous dispersion after the completion of polymerization. However, if desired, it may be introduced either before or during the polymerization. The amount of solvent may vary widely. At least sufficient amount should be employed to cause the dispersion to form continuous films on drying at temperatures below 100° C. Sufficient solvent may be employed to cause coalescence of film-formation merely on drying at normal room temperatures such as at 15° or 20° C. Obviously, the proportion of the solvent employed will depend upon the minimum temperature of film-formation desired and the particular polymer in the aqueous dispersion.

Besides introducing the solvent there may be introduced into the dispersion pigments or dyes to modify the coating when the clear, colorless coating is not desired.

The dispersion is applied to the asbestos-cement compositions by conventional means, such as spraying, flooding, etc. While it can be applied either before or after any compressing and/or embossing treatment of the compositions, it is preferred to do so after the composition has been compressed and has been subjected to a heat-treatment, as for example by passage through an oven or under a bank of radiant heaters. Alternatively, compositions which have had no heat treatment can be coated and then heated. What is essential is that the applied coatings of the dispersions dry rapidly to tack-free condition before the coated compositions are stacked for curing.

A description of the preferred mode of operation is as follows: The freshly formed wet, plastic asbestos-cement sheet, colored or uncolored, passes from the forming part of the machine on a conveyor through a gas-fired, radiant heat oven. This raises the temperature of the surface of the sheet to approximately 140° to 150° F. and reduces the moisture content to about 20%. The sheet, still plastic and non-rigid, is then textured by contact with an embossing roll. Immediately following this, it is sprayed with a dispersion at a solids-content of about 10 to 20%, although the solids-content is not critical and is merely adjusted to permit easy application of a film having adequate thickness. A deposit which is equivalent to two grams or more—and preferably from two to three grams—of resinous solids per square foot is applied. The residual heat in the sheet is sufficient to flash dry the dispersion to the point where a clear, tack-free, non-blocking film of resin is deposited. The sheets can then be cut to the desired size and shape. At this stage the coated asbestos-cement compositions are so soft and plastic that they can be deformed by manual pinching, but they are also tack-free. They are next removed from the conveyor and are stacked for curing.

The weight or pressure on the sheets or layers of the composition in the lower portions of the piles is of necessity very high but the coatings of resin do not become tacky or adherent to other surfaces. Rather, they maintain excellent adhesion to only the surface on which they were applied.

The curing of shingles may be carried out under atmospheric conditions during which the sheets are subjected to temperatures no higher than obtainable from the exotherm of the hydration of cement.

An accelerated curing cycle may also be used in order to speed up the hydration of the cement to a point where a complete or nearly complete hydration is accomplished in a period of 6 to 16 hours. Under the conditions of autoclaving the coated shingles possibly after several days of natural ageing are placed in a high pressure chamber known as the autoclave and after sealing off this container, steam is pumped into the autoclave to maintain the temperature therein between 150° and 180° C. Under such hot and moist conditions blooming on the surface of the shingles becomes very critical and it is virtually impossible to cure uncoated shingles without encountering this difficulty. The coating prepared in accordance with this invention eliminates this problem. At the end of the curing cycle the sheets are removed from the autoclave and, if not trimmed prior to autoclaving, may then be cut and packaged for shipment.

In the following examples which are illustrative of the present invention, the parts and percentages are by weight unless otherwise indicated.

*Example 1*

A sheet of asbestos-cement composition was prepared on a conventional cylinder-type forming machine. The wet sheet was 5/32 of an inch in thickness and was made up of several laminations and a veneer of approximately 0.015 inch thickness. The base contained on a solids-basis: 80% Portland cement, and 20% asbestos fiber. The veneer contained on a solids-basis: 60% Portland cement, 18% asbestos fibers and 22% mineral oxide pigments and extenders. The composite sheet containing approximately 20% moisture-content was run under a bank of radiant heaters which reduced the moisture-content to about 18%. The sheet was then textured by means of embossing rolls after which it was sprayed while at about 140° F. with an aqueous dispersion containing 20% by weight of a copolymer of about 89% of methyl methacrylate, about 10% of ethyl acrylate, and about ½% of methacrylic acid, about 3%, on the weight of copolymer, of sodium lauryl sulfate, and 40% by weight, based on the weight of the copolymer, of 2-butoxyethyl acetate. The spraying equipment was adjusted to the speed of the machine so that the amount of dispersion applied was such as to deposit about 2 to 3 grams of polymer, on a dry basis, per square foot of the asbestos-cement sheet. The coated sheets were passed through a short drying section during which time the moisture content of the resin film was reduced and a substantial portion of the organic solvent was also removed leaving a continuous tack-free film of the polymer on the sheets. The sheet was then cut into individual sections or units measuring 2 ft. by 4 ft. and these were immediately stacked to a height of two to three feet on wooden pallets. At this stage, the sheets were soft and could be deformed or ruptured by ordinary pinching with thumb and finger. They were not rigid but were so plastic that they conformed to the shape of a surface on which they were placed. The units were piled one on another and were stored in a warehouse at ambient temperature for three days. The individual sheets were then removed from the pallets, were punched and trimmed to final dimensions and were packaged. In no instance was there evidence of blocking. That is, the sheets which had been coated and stacked in the plastic condition gave no evidence of adhesion, one to another.

*Example 2*

The procedure of Example 1 is repeated except that the cut units were piled one on another and instead of being stored in a warehouse at ambient temperature for three days, the piled units were introduced into an autoclave wherein they were heated to about 170° C. for a period of eight hours. During the autoclaving, the solvent was substantially completely removed. On removal from the autoclave it was found that the sheets did not block together and the asbestos-cement units carried uniform, clear, glossy films of the polymer.

*Example 3*

The procedure of Example 2 was repeated except that the polymer was formed of 85% of methyl methacrylate and 15% by weight of methyl acrylate, and the solvent employed was isophorone.

*Example 4*

The procedure of Example 2 was repeated except that benzyl alcohol was used in place of butoxyethyl acetate as solvent for the acrylic copolymer.

*Example 5*

The procedure of Example 2 was repeated except that 2-(2-butoxyethoxy)ethyl acetate was used in place of butoxyethyl acetate as solvent for the acrylic copolymer.

*Example 6*

Examples 1 and 2 were repeated except that the 2-butoxyethyl acetate was replaced by β-(butoxy)-ethanol, the sodium lauryl sulfate was replaced by an ethylene oxide condensate of t-octylphenol, and the concentration of copolymer in the aqueous dispersion was 30%.

*Example 7*

Example 6 was repeated except the solvent used was methyl hexyl ketone.

*Example 8*

Example 6 was repeated except the solvent used was dimethyl formamide.

*Example 9*

Example 6 was repeated except the solvent used was the monomethyl ether of diethylene glycol.

The cement products obtained in accordance with the present invention have attractive sheen and appearance. The coated products retain their attractive appearance over long periods of time and show no efflorescence, no discoloration in spite of the usual exposure to the rays of the sun, and are free from deterioration by hydrolytic action.

It is to be understood that changes and variations may be made without departing from the spirit and scope of the invention as defined in the appended claims.

We claim:

1. A process for preparing a coated cement product which comprises applying to a formed but uncured, heated, asbestos-cement composition a coating of an aqueous dispersion containing (A) a linear copolymer of (a) 85 to 99.75% by weight of methyl methacrylate, and (b) about ¼ to 15% by weight of at least one other copolymerizable monoethylenically unsaturated monomer selected from the group consisting of esters of acrylic acid with an alcohol having 1 to 18 carbon atoms and hydrophilic monomers selected from the group consisting of acrylic acid, methacrylic acid, itaconic acid, acrylamide, methacrylamide, beta-hydroxyethyl acrylate, beta-hydroxyethyl vinyl ether, beta-aminoethyl acrylate, beta-N,N-dimethylaminoethyl acrylate, the total amount of hydrophilic monomer being not over 2% by weight, based on the entire weight of monomers, and (B) 20 to 60% by weight, based on the weight of the copolymer, of an organic solvent for the copolymer having a boiling point in the range from 150° to 255° C., the polymer content of the above-mentioned dispersion consisting exclusively of linear copolymeric material as defined in (A) herein the amount of the solvent being at least sufficient to cause film-formation of copolymer in the coating merely on drying at a temperature below 100° C., and the temperature of the asbestos-cement composition at the time of application of the coating being sufficiently high to cause the coating to rapidly dry to tack-free condition, and then curing the tack-free coated cement compositions while stacked on one another.

2. A process for preparing a coated cement product which comprises applying to a formed but uncured asbestos-cement composition while in a wet, soft, heated, and plastic condition a coating of an aqueous dispersion containing (A) a linear emulsion copolymer of (a) 85 to 99.75% by weight of methyl methacrylate and (b) about ¼ to 15% by weight of at least one other copolymerizable monoethylenically unsaturated monomer selected from the group consisting of esters of acrylic acid with an alcohol having 1 to 18 carbon atoms and hydrophilic monomers selected from the group consisting of acrylic acid, methacrylic acid, itaconic acid, acrylamide, methacrylamide, beta-hydroxyethyl acrylate, beta-hydroxyethyl vinyl ether, beta-aminoethyl acrylate, beta-N,N-dimethylaminoethyl acrylate, the total amount of hydrophilic monomer being not over 2% by weight, based on the entire weight of monomers, and (B) 20 to 60% by weight, based on the weight of the copolymer, of an organic solvent for the copolymer having a boiling point in the range from 150° to 255° C., the polymer content of the above-mentioned dispersion consisting exclusively of linear copolymeric material as defined in (A) herein the amount of the solvent being at least sufficient to cause film-formation of copolymer in the coating merely on drying at a temperature below 100° C., and the temperature of the asbestos-cement composition at the time of application of the coating being sufficiently high to cause the coating to rapidly dry to tack-free condition, and then curing the tack-free coated cement compositions while stacked on one another at a temperature of 150° to 180° C.

3. A process for preparing a coated cement product which comprises applying to a formed but uncured, heated, asbestos-cement composition a coating of an aqueous dispersion containing (A) a linear copolymer of (a) 85 to 99.5% by weight of methyl methacrylate, (b) about ¼ to 15% by weight of at least one ester of acrylic acid with an alcohol having 1 to 18 carbon atoms, and (c) about ¼ to 2% by weight of a copolymerizable acid, and (B) 20 to 60% by weight, based on the weight of the copolymer of the organic solvent for the polymer having a boiling point in the range from 150° to 255° C., the polymer content of the above-mentioned dispersion consisting exclusively of linear copolymeric material as defined in (A) herein the amount of the solvent being at least sufficient to cause film-formation of copolymer in the coating merely on drying at a temperature below 100° C., and the temperature of the asbestos-cement composition at the time of application of the coating being sufficiently high to cause the coating to rapidly dry to tack-free condition, and then curing the tack-free coated cement compositions while stacked on one another.

4. A process for preparing a coated cement product which comprises applying to a formed but uncured, heated, asbestos-cement composition a coating of an aqueous dispersion containing (A) a linear copolymer of (a) 85 to 99.5% by weight of methyl methacrylate, (b) about ¼ to 15% by weight of at least one ester of acrylic acid with an alcohol having 1 to 18 carbon atoms, and (c) about ¼ to 2% by weight of methacrylic acid, and (B) 20 to 60% by weight, based on the weight of the copolymer, of an organic solvent for the copolymer having a boiling point in the range from 150° to 255° C., the polymer content of the above-mentioned dispersion consisting exclusively of linear copolymeric material as defined in (A) herein the amount of the solvent being at least sufficient to cause film-formation of copolymer in the coating merely on drying at a temperature below 100° C., and the temperature of the asbestos-cement composition at the time of application of the coating being sufficiently high to cause the coating to rapidly dry to tack-free condition, and then curing the tack-free coated cement compositions while stacked on one another.

5. A process for preparing a coated cement product which comprises applying to a formed but uncured, heated, asbestos-cement composition while in a wet, soft, and plastic condition and a temperature of about 55° to 65° C. a coating of an aqueous dispersion containing (A) a linear emulsion copolymer of (a) 85 to 99.5% by weight of methyl methacrylate, and (b) about ½ to 15% by weight of at least one other copolymerizable monoethylenically unsaturated monomer selected from the group consisting of esters of acrylic acid with an alcohol having 1 to 18 carbon atoms and hydrophilic monomers selected from the group consisting of acrylic acid, methacrylic acid, itaconic acid, acrylamide, methacrylamide, beta-hydroxyethyl acrylate, beta-hydroxyethyl vinyl ether, beta-aminoethyl acrylate, beta-N,N-dimethylaminoethyl acrylate, the total amount of hydrophilic monomer being not over 2% by weight, based on the entire weight of monomers, and (B) 20 to 60% by weight, based on the weight of the polymer, of an organic solvent for the copolymer having a boiling point in the range from 150° to 255° C., the polymer content of the above-mentioned dispersion consisting exclusively of linear copolymeric material as defined in (A) herein the amount of the solvent being at least sufficient to cause film-formation of copolymer in the coating merely on drying at a temperature below 100° C., and then curing the tack-free coated cement compositions while stacked on one another at a temperature of 150° to 180° C.

6. A process for preparing a coated cement product which comprises applying to a formed but uncured, heated, asbestos-cement composition a coating of an aqueous dispersion containing (A) a linear emulsion copolymer of (a) 85 to 99.75% by weight of methyl methacrylate, and (b) about ¼ to 15% by weight of at least one other copolymerizable monoethylenically unsaturated monomer selected from the group consisting of esters of acrylic acid with an alcohol having 1 to 18 carbon atoms and hydrophilic monomers selected from the group consisting of acrylic acid, methacrylic acid, itaconic acid, acrylamide, methacrylamide, beta-hydroxyethyl acrylate, beta-hydroxyethyl vinyl ether, beta-aminoethyl acrylate, beta-N,N-dimethylaminoethyl acrylate, the total amount of hydrophilic monomer being not over 2% by weight, based on the entire weight of monomers, and (B) 20 to 60% by weight, based on the weight of the copolymer, of an organic solvent for the copolymer having a boiling point in the range from 150° to 255° C., the polymer content of the above-mentioned dispersion consisting exclusively of linear copolymeric material as defined in (A) herein the amount of the solvent being at least sufficient to cause film-formation of copolymer in the coating merely on drying at a temperature below 100° C., and the temperature of the asbestos-cement composition at the time of application of the coating being sufficiently high to cause the coating to rapidly dry to tack-free condition, and then curing the tack-free coated cement compositions while stacked on one another at a temperature of 150° to 180° C., said organic solvent having the formula $$R^0O(C_2H_4O)_nH$$

where $R^0$ is selected from the group consisting of phenyl and $C_1$–$C_6$ alkyl groups, and $n$ is an integer having a value of 1 to 2.

7. A process for preparing a coated cement product which comprises applying to a formed but uncured, heated, asbestos-cement composition a coating of an aqueous dispersion containing (A) a linear emulsion copolymer of (a) 85 to 99.75% by weight of methyl methacrylate, and (b) about ¼ to 15% by weight of at least one other copolymerizable monoethylenically unsaturated monomer selected from the group consisting of esters of acrylic acid with an alcohol having 1 to 18 carbon atoms and hydrophilic monomers selected from the group consisting of acrylic acid, methacrylic acid, itaconic acid, acrylamide, methacrylamide, beta-hydroxyethyl acrylate, beta-hydroxyethyl vinyl ether, beta-aminoethyl acrylate, beta-N,N-dimethylaminoethyl acrylate, the total amount of hydrophilic monomer being not over 2% by weight, based on the entire weight of monomers, and (B) 20 to 60% by weight, based on the weight of the copolymer, of an organic solvent for the copolymer having a boiling point in the range from 150° to 255° C., the polymer content of the above-mentioned dispersion consisting exclusively of linear copolymeric material as defined in (A) herein the amount of the solvent being at least sufficient to cause film-formation of copolymer in the coating merely on drying at a temperature below 100° C., and the temperature of the asbestos-cement composition at the time of application of the coating being sufficiently high to cause the coating to rapidly dry to tack-free condition, and then curing the tack-free coated cement compositions while stacked on one another at a temperature of 150° to 180° C., said organic solvent having the formula $$R'-(OCH_2-CH_2)_nOCR \parallel O$$

where

R is selected from the group consisting of alkyl groups of 1 to 3 carbon atoms and a phenyl group, $n$ is a number from 1 to 2, and R' is an alkyl group of 1 to 4 carbon atoms.

8. A process for preparing a coated cement product which comprises applying to a formed but uncured, heated, asbestos-cement composition while in a wet, soft, and plastic condition a coating of an aqueous dispersion containing (A) a linear emulsion copolymer of about 89% of methyl methacrylate, about 10% of ethyl acrylate, and about ½% of methacrylic acid, and (B) 20 to 60% by weight, based on the weight of the copolymer, of β-(butoxy)-ethanol, the polymer content of the above-mentioned dispersion consisting exclusively of linear copolymeric material as defined in (A) herein the amount of the β-(butoxy)-ethanol being at least sufficient to cause film-formation of copolymer in the coating merely on drying at a temperature below 100° C., and the temperature of the asbestos-cement composition at the time of application of the coating being sufficiently high to cause the coating to rapidly dry to tack-free condition, and then curing the tack-free coated cement compositions while stacked on one another at a temperature of 150° to 180° C.

9. A process for preparing a coated cement product which comprises applying to a formed but uncured, heated, asbestos-cement composition while in a wet, soft, and plastic condition a coating of an aqueous dispersion containing (A) a linear emulsion copolymer of about 89% of methyl methacrylate, about 10% of ethyl acrylate, and about ½% of methacrylic acid, and (B) 20 to 60% by weight, based on the weight of the copolymer, of the monomethyl ether of diethylene glycol, the polymer content of the above-mentioned dispersion consisting exclusively of linear copolymeric material as defined in (A) herein the amount of the ether being at least sufficient to cause film-formation of copolymer in the coating merely on drying at a temperature below 100° C., and the temperature of the asbestos-cement composition at the time of application of the coating being sufficiently high to cause the coating to rapidly dry to tack-free condition, and then curing the tack-free coated cement compositions while stacked on one another at a temperature of 150° to 180° C.

10. A process for preparing a coated cement product which comprises applying to a formed but uncured, heated, asbestos-cement composition while in a wet, soft, and plastic condition a coating of an aqueous dispersion containing (A) a linear emulsion copolymer of about 89% of methyl methacrylate, about 10% of ethyl acrylate, and about ½% of methacrylic acid, and (B) 20 to 60% by weight, based on the weight of the copolymer, of 2-butoxyethyl acetate, the polymer content of the above-mentioned dispersion consisting exclusively of linear copolymeric material as defined in (A) herein the amount of the 2-butoxyethyl acetate being at least sufficient to cause film-formation of copolymer in the coating merely on drying at a temperature below 100° C., and the temperature of the asbestos-cement composition at the time of application of the coating being sufficiently high to cause the coating to rapidly dry to tack-free condition and then curing the tack-free coated cement compositions while stacked on one another at a temperature of 150° to 180° C.

11. A process for preparing a coated cement product which comprises applying to a formed but uncured, heated, asbestos-cement composition while in a wet, soft, and plastic condition a coating of an aqueous dispersion containing (A) a linear emulsion copolymer of about 89% of methyl methacrylate, about 10% of ethyl acrylate, and about ½% of methacrylic acid, and (B) 20 to 60% by weight, based on the weight of the copolymer, of isophorone, the polymer content of the above-mentioned dispersion consisting exclusively of linear copolymeric material as defined in (A) herein the amount of the isophorone being at least sufficient to cause film-formation of copolymer in the coating merely on drying at a temperature below 100° C., and the temperature of the asbestos-cement composition at the time of application of the coating being sufficiently high to cause the coating to rapidly dry to tack-free condition, and then curing the tack-free coated cement compositions while stacked on one another at a temperature of 150° to 180° C.

12. A process for preparing a coated cement product which comprises applying to a formed but uncured, heated, asbestos-cement composition while in a wet, soft, and plastic condition a coating of an aqueous dispersion containing (A) a linear emulsion copolymer of about 89% of methyl methacrylate, about 10% of ethyl acrylate, and about ½% of methacrylic acid, and (B) 20 to 60% by weight, based on the weight of the copolymer, of benzyl alcohol, the polymer content of the above-mentioned dispersion consisting exclusively of linear copolymeric material as defined in (A) herein the amount of the benzyl alcohol being at least sufficient to cause film-formation of copolymer in the coating merely on drying at a temperature below 100° C., and the temperature of the asbestos-cement composition at the time of application of the coating being sufficiently high to cause the coating to rapidly dry to tack-free condition, and then curing the tack-free coated cement compositions while stacked on one another at a temperature of 150° to 180° C.

References Cited in the file of this patent

UNITED STATES PATENTS

| | | |
|---|---|---|
| 2,046,885 | Strain | July 7, 1936 |
| 2,046,886 | Strain | July 7, 1936 |
| 2,392,135 | Farr | Jan. 1, 1946 |
| 2,509,857 | Borcherdt et al. | May 30, 1950 |
| 2,778,283 | Bettoli | Jan. 22, 1957 |
| 2,892,804 | Crissey | June 30, 1959 |
| 3,027,294 | Bettoli et al. | Mar. 27, 1962 |

FOREIGN PATENTS

| | | |
|---|---|---|
| 144,836 | Australia | Jan. 23, 1952 |

OTHER REFERENCES

Ser. No. 397,138, Fikentscher et al. (A.P.C.), published May 11, 1943.